(12) United States Patent
Kunito et al.

(10) Patent No.: US 7,136,358 B2
(45) Date of Patent: Nov. 14, 2006

(54) DATA CONVERTER APPARATUS AND METHOD, DATA TRANSMISSION/RECEPTION APPARATUS AND METHOD, AND NETWORK SYSTEM

(75) Inventors: Yoshiyuki Kunito, Kanagawa (JP); Atsushi Okamori, Tokyo (JP); Ryusuke Sawatari, Kanagawa (JP); Yutaka Miyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 906 days.

(21) Appl. No.: 09/894,472

(22) Filed: Jun. 27, 2001

(65) Prior Publication Data

US 2002/0021669 A1 Feb. 21, 2002

(30) Foreign Application Priority Data

Jun. 29, 2000 (JP) ............................. 2000-197405

(51) Int. Cl.
*H04L 12/26* (2006.01)
*H04J 3/22* (2006.01)
*G06F 15/16* (2006.01)
*H04Q 7/20* (2006.01)

(52) U.S. Cl. ...................... 370/238; 370/466; 370/401; 709/241; 455/445

(58) Field of Classification Search ............... 370/466, 370/352–356, 312, 413, 400, 401, 238, 238.1; 709/241; 455/445
See application file for complete search history.

(56) References Cited

U.S. PATENT DOCUMENTS

| 5,347,272 | A | * | 9/1994 | Ota ............................. 370/392 |
| 5,802,049 | A | * | 9/1998 | Watanabe .................... 370/390 |
| 6,032,190 | A | * | 2/2000 | Bremer et al. .............. 709/238 |
| 6,205,211 | B1 | * | 3/2001 | Thomas et al. ........ 379/114.06 |
| 6,553,002 | B1 | * | 4/2003 | Bremer et al. .............. 370/254 |
| 6,741,608 | B1 | * | 5/2004 | Bouis et al. ................ 370/465 |
| 6,751,650 | B1 | * | 6/2004 | Finch et al. ................ 709/203 |
| 6,795,917 | B1 | * | 9/2004 | Ylonen ....................... 713/160 |
| 6,801,502 | B1 | * | 10/2004 | Rexford et al. ............. 370/235 |

* cited by examiner

*Primary Examiner*—Chi Pham
*Assistant Examiner*—Ronald Abelson
(74) *Attorney, Agent, or Firm*—Finnegan, Henderson, Farabow, Garrett & Dunner, L.L.P.

(57) ABSTRACT

A network system includes a plurality of communication nodes. In the network system, data transmitted from a server apparatus (1) is received by a PC (2) and a PDA (3). Each of relay nodes 4 obtains a communication network parameter concerning the communication network connecting the communication nodes with each other. Each of the relay nodes (4) also determines a communication route, based on a format conversion parameter concerning format of data transmitted from the server apparatus (1) and types of format conversion at format converters (5a) and (5b), and the obtained communication network parameter.

39 Claims, 16 Drawing Sheets

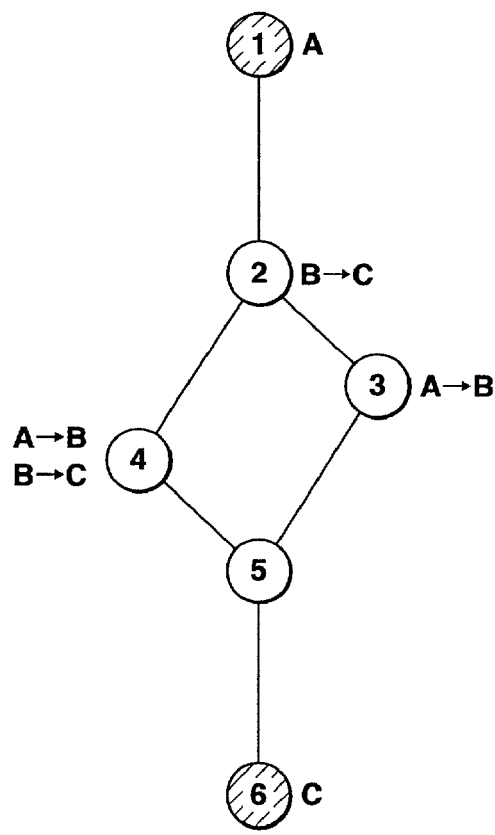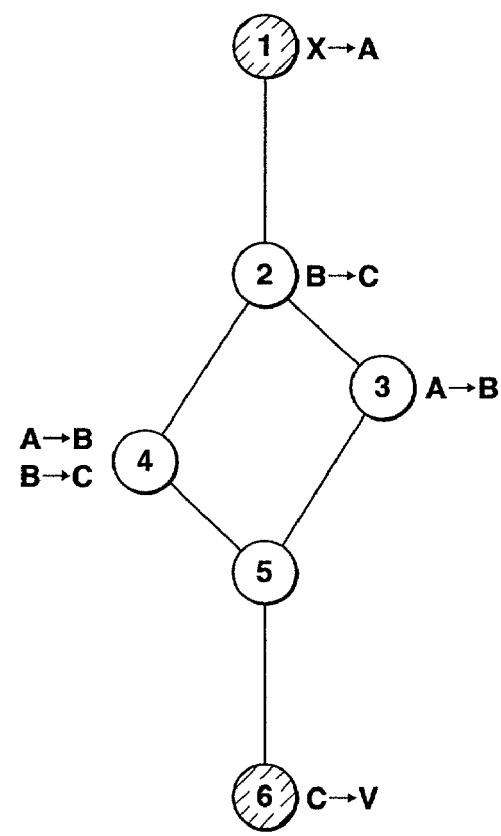
FIG.10A    FIG.10B

DATA CONVERTER APPARATUS AND METHOD, DATA TRANSMISSION/RECEPTION APPARATUS AND METHOD, AND NETWORK SYSTEM

BACKGROUND OF THE INVENTION

1. Field of the Invention

The present invention relates to a data converter and a method thereof, a data transmission/reception apparatus and a method thereof, and a network system, for example in a network environment comprising a server, a relay node and a client.

2. Description of the Related Art

In recent years, a large number of network applications for transmitting multimedia information such as audio, moving picture, still images, and the like have been provided. A network system capable of transmitting various data has been constructed.

In this kind of network system, the communication band must be wide when transmitting moving picture data of high image quality or the like. Various information compression techniques such as JPEG (Joint Photographic coding Experts Group), MPEG (Moving Picture Experts Group), ATRAC (Adaptive Transform Acoustic Coding), and the like are required as technical elements.

In many cases, however, compression formats such as MPEG and the like are respectively peculiar to the formats and are therefore not compatible with each other. Particularly, when transmitting various multimedia information items in the network system, the encoder in the data transmitter side and the decoder in the data receiver side must have compatibility with one same compression format. In the present situation, a personal computer is often used as a receiver terminal in the data receiver side. Therefore, many kinds of compression formats are covered by installing a plurality of decoder software applications corresponding to the compression formats.

However, in the network system, there are several dedicated terminals that cannot be compatible with a given data format used in a data transmitter side. For example, it is known that a cellular phone terminal performs compression according to a system in which prepared voice vectors (several ten sets of amplitude data) such as CELP (Codebook Excited Linear Prediction) and the like are combined with each other to achieve encoding at a transmission speed of about 10 k bit/sec. The cellular phone terminal, however, can communicate with a normal analogue telephone which does not adopts this kind of method.

As shown in FIG. 1, an audio signal encoded according to the CELP system by a cellular telephone 100 is converted into an analogue audio signal by a CELP decoder 102 through a cellular telephone network 101, and the analogue audio signal is then transmitted to an analogue telephone 104 through an analogue telephone network 103. Thus, in a conventional network system, matching between different formats is achieved by using a dedicated converter which is previously installed, and connection is made between the cellular telephone 100 and the analogue telephone 104.

Meanwhile, in a network system using Internet protocol, information items in complicated various data formats in the transmitter side are transmitted and received, unlike the telephone network using a simple data format in the transmitter side. In addition, one same data transmission apparatus is frequently accessed from receiver terminals compatible with many different data formats.

For example, if a server apparatus 201 stores moving picture data according to MPEG 2 standard and if moving picture data according to MPEG2 is transmitted to a PC 202 as a receiver terminal, as shown in FIG. 2, data is transmitted through a communication route R101 using network nodes 203a, 203c, and 203d as relay nodes. In case where data is transmitted to a PDA (Personal Digital Assistant) 204 compatible with only MPEG4, format conversion is carried out from MPEG 2 to MPEG4 by a format converter 205. Thereafter, moving picture data is transmitted to the PDA 204 through a communication route R102, using the network nodes 203a and 203c as relay nodes. This format converter 205 is supplied by the server apparatus 201 and has a function to convert data from MPEG2 format into any of various data formats in the receiver side.

However, the compression algorithm advances year by year as the algorithm has advanced from MPEG2 to MPEG4. It is known that a system for transmitting data with high quality at a higher compression rate has been proposed. Although a receiver terminal which has a margin for processing ability like the PC 202 can have a plurality of decoder software applications, format conversion should be carried out, as a service of the server apparatus 201 as a data transmitter side, by the format converter 205 in the PDA 204 as a portable device which must minimize power consumption or a terminal which cannot update its own functions.

In addition, the cost for providing services will increase and burden the data transmitter side if the data transmitter side sets format converters 205 each compatible with all formats, including data of formats which are year by year added and stored into the server apparatus 201 in the data transmitter side. In particular, it is often irrational to set such format converters 205 that perform conversion into a data format used less frequently, in all data transmitters.

Further, when transmitting multimedia information, multi-cast communication is used for casting simultaneously information having same contents to a plurality of terminals, as used in current broadcasting. In the multi-cast communication, only one single moving picture data item needs to be transmitted to branched network nodes. However, when terminals at destinations use different data formats, it is necessary to transmit data including same contents in different data formats from the data transmitter side. For example, in FIG. 2, moving picture data having same contents are multi-cast to the PC 202 and PDA 204, two kinds of data which are respectively of the MPEG2 format and the MPEG4 format must be transmitted, where viewed from the data transmitter side. It thus cannot be said that network resources are used efficiently. Further, this problem becomes more conspicuous when it is necessary to multi-cast data in many data formats such as MPEG2, MPEG1, DV, motion JPEG, and the like.

BRIEF SUMMARY OF THE INVENTION

The present invention hence has been proposed in view of the situation as described above and has an object of transmitting data to a plurality of receiver terminals compatible with different data formats by using efficiently network resources.

To achieve the above object, the present invention provides a data converter for use in a network system comprised of a plurality of communication nodes in which data transmitted from a transmitter communication node is received by a receiver communication node, the data converter comprising data reception means for receiving transmitted data transmitted from the transmitter communication node, information reception means for receiving a communication network parameter concerning a communication network connecting the communication nodes with each other, format conversion means for converting a format of the transmitted data received by the reception means, route control means for determining a communication route, based on a format conversion parameter concerning the format of the transmitted data received by the reception means, a type of format conversion performed by the format conversion means, and a type of a format conversion function of another communication node, and a communication network parameter received by the information reception means, and transmission means for transmitting the transmitted data converted by the format conversion means to another communication node, in accordance with the communication route determined by the route control means.

To achieve the above object, the present invention provides a data conversion method for use in a network system having a plurality of communication nodes, in which data transmitted from a transmitter communication node is received by a receiver communication node, the method comprising steps of receiving previously a communication network parameter concerning a communication network which connects the communication nodes with each other, converting a format of the transmitted data when the transmitted data from the transmitter communication node is received, determining a communication route, based on a format conversion parameter concerning a format of the transmitted data, a type of the format conversion, and a type of format conversion function of another communication node, and the communication network parameter, when converting the format of the transmitted data, and transmitting the converted transmitted data to the another communication node, in accordance with the communication route.

To achieve the above object, the present invention provides a data transmission/reception apparatus, for use in a network system comprised of a plurality of communication nodes, for relaying data transmitted from the communication node and transmitting the relayed data to another communication node, the data transmission/reception apparatus comprising data reception means for receiving data transmitted from another communication node, route control means for determining a communication route, based on a format of the transmitted data received by the reception means, and a format conversion parameter concerning a type of format conversion of another communication node, and transmission means for transmitting the transmitted data received by the reception means to another communication node, in accordance with the communication route determined by the route control means.

To achieve the above object, the present invention provides a data transmission/reception method for relaying data from a communication node and transmitting the transmitted data to another communication node in a network system comprised of a plurality of communication nodes, the method comprising the steps of receiving transmitted data, determining a communication route, based on a format of the received transmitted data, and a format conversion parameter concerning a format conversion function of the another communication node, and transmitting the received transmitted data to the another communication node, in, accordance with the determined communication route.

To achieve the above object, the present invention provides a network system including a plurality of communication nodes, wherein data transmitted from a transmitter communication node is received by a receiver communication node, comprising information obtaining means for obtaining a communication network parameter concerning a communication network connecting the communication nodes with each other, format conversion means for converting a format of the transmitted data transmitted from the transmitter communication node, and route control means for determining a communication route, based on a format conversion parameter concerning the format of the transmitted data transmitted from the transmitter communication node and a type of format conversion performed by the format conversion means, and the communication network parameter obtained by the information obtaining means.

According to the present invention, format conversion is carried out by a data conversion function provided between transmitter's and receiver's communication nodes, and route control is performed in correspondence with the type of format. Network resources can thus be efficiently used and data can be transmitted to a plurality of receiver terminals corresponding to different data formats.

BRIEF DESCRIPTION OF THE DRAWINGS

FIG. 10A and FIG. 10B show image graphs expressing a network system to which the present invention is applied wherein FIG. 10A shows a first expression method and FIG. 10B shows a second expression method;

DESCRIPTION OF THE PREFERRED EMBODIMENTS

In the following, embodiments of the present invention will be explained in more details with reference to the drawings.

Figure 1:
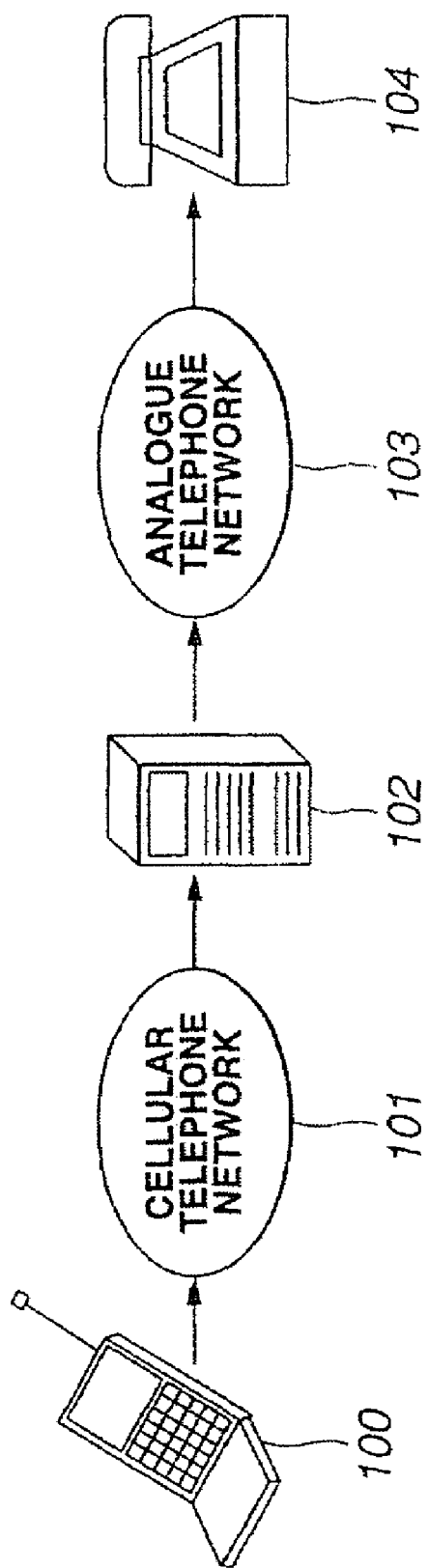
FIG. 1 is a view showing a conventional network system.
Figure 2:
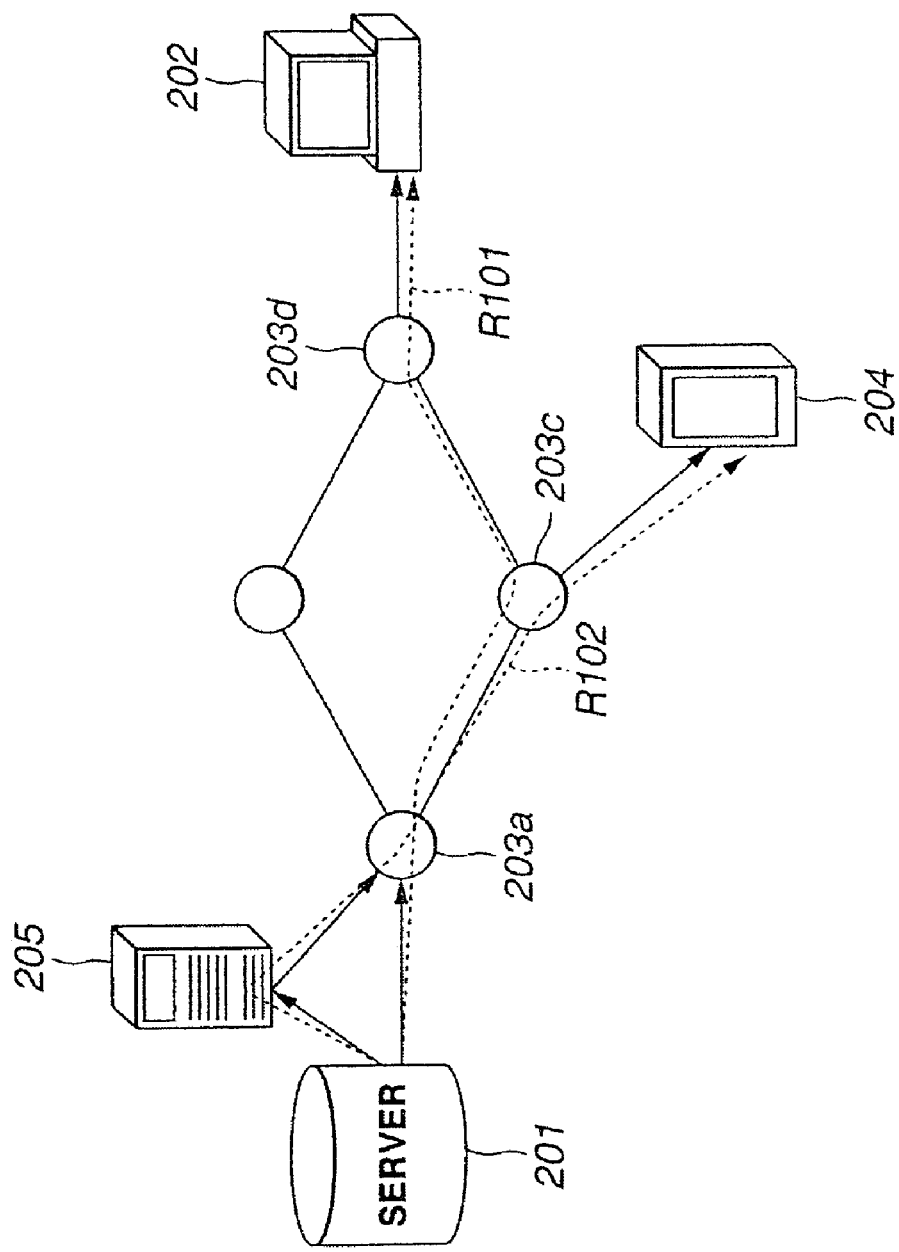
FIG. 2 is a view showing a conventional network system which performs format conversion.
Figure 3:
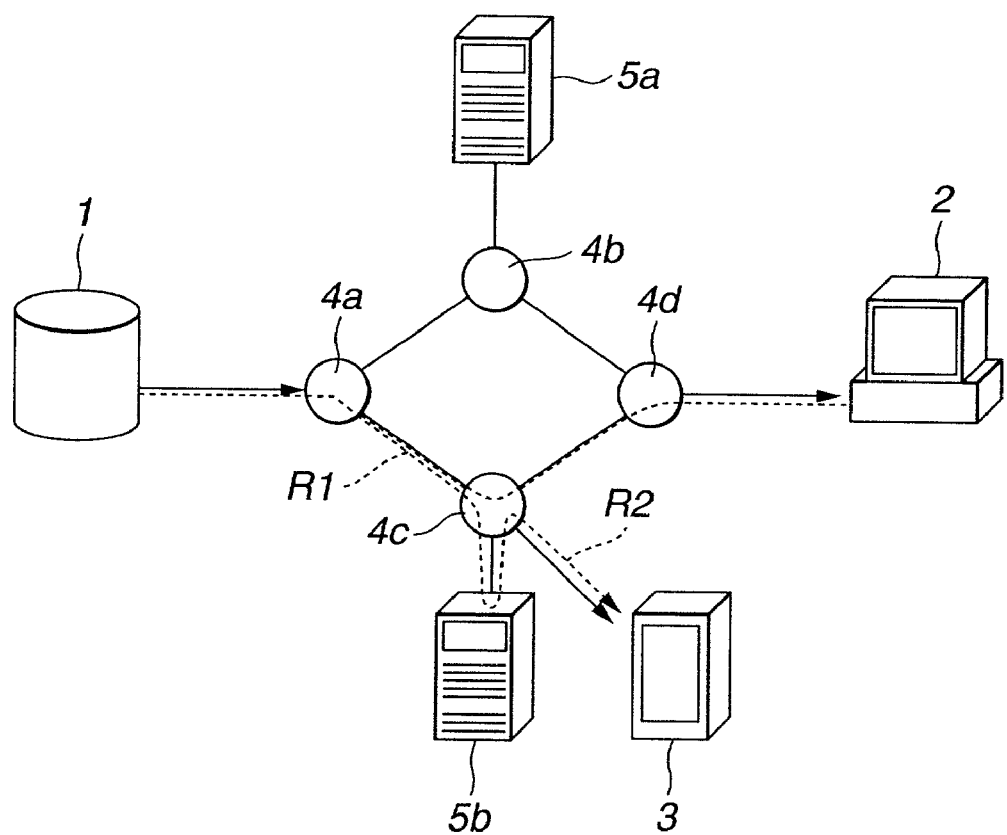
FIG. 3 is a block diagram showing the structure of a network system to which the present invention is applied.

The present invention is applied to a network system as shown in FIG. 3.

This network system is constructed in a structure in which a server apparatus 1 is connected with a PC 2 and a PDA 3 as receiver terminals through a plurality of relay nodes 4a to 4d (hereinafter simply called "relay nodes 4" when they are dealt with as a whole) and the relay nodes 4b and 4c are connected with format converters 5a and 5b (hereinafter simply called "format converters 5" when they are dealt with as a whole).

In the present embodiment, explanation will be made of an embodiment in which moving picture data is stored into the server apparatus 1 and moving picture data is transmitted as transmitted data. Needless to say, however, the present invention is applicable to the case of transmitting still image data and audio data.

In the explanation made below, the server apparatus 1, PC 2, PDA 3, relay nodes 4, and format converters 5 which form part of the network system will be generally called communication nodes.

The server apparatus 1 stores moving picture data in the MPEG2 format. This server apparatus 1 transmits the stored moving picture data, as transmitted data added with various information, to the relay nodes 4a, in accordance with a data transmission request from the data receiver side. Also, the server apparatus 1 has a function of broadcasting the same transmitted data to the PC 2 and PDA 3.

The PC 2 is operated by its user and has a function of receiving the data transmitted from the server apparatus 1 through the relay nodes 4. This PC 2 has a function of receiving only the transmitted data including moving picture data of the MPEG2 format and of decoding the moving picture data. This PC 2 displays the moving picture data obtained by decoding, thereby to present its contents to the user.

The PDA 3 is operated by its user and has a function of receiving transmitted data transmitted from the server apparatus 1 through the relay nodes 4. This PDA 3 has a function of receiving only the transmitted data including moving picture data of MPEG4 format and of decoding moving picture data. This PDA 3 displays moving picture data obtained by decoding, thereby to present its contents to the user.

Each of the relay nodes 4 is constructed by a data relay device such as a router or the like, and has a function of routing transmitted data in accordance with an internal routing table. Each of thee relay nodes 4 controls routes, based on format information concerning the data format of moving picture data included in transmitted data, thereby to transmit the transmitted data to the format converters 5 and the other relay nodes 4.

The format converters 5 are connected with the relay nodes 4 and have a function of converting the data format of the moving picture data included in the transmitted data from the relay nodes 4. After making format conversion, the format converter 5 rewrites the format information to information indicating the kind of the data format after the format conversion. The format converter 5 returns transmitted data including the moving picture data after the format conversion to the connected relay nodes 4.

In this network system, format converters 5 connected with the relay nodes 4 are provided to carry out format conversion in the middle of routing arranged by the relay nodes 4.

To transmit moving picture data to the PC 2 in this network system, transmitted data of the MPEG2 format is transmitted from the server apparatus 1 through a communication route R1 relayed by the relay nodes 4a, 4c, and 4d.

Also, to transmit moving picture data to the PDA 3 in the network system, transmitted data of MPEG2 format is transmitted from the server apparatus 1 through the relay nodes 4a and 4c and next through a communication route R2. At this time, data is transmitted from the relay node 4c to the format converter 5b. In the format converter 5b, transmitted data is converted into the MPEG4 format. Further, the format converter 5b transmits the transmitting data subjected to format conversion, to the PDA 3 through the relay nodes 4.

Figure 4:
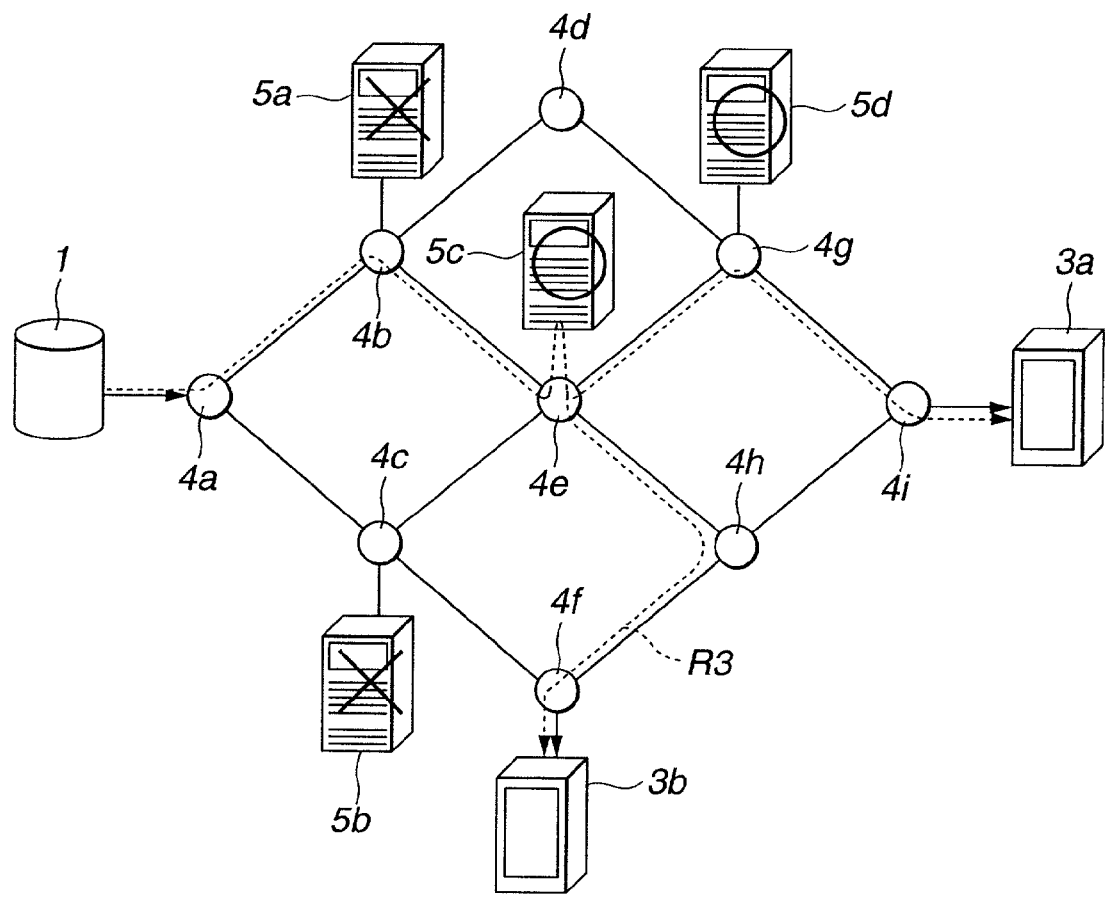
FIG. 4 is a block diagram showing another structure of the network system to which the present invention is applied.

Alternatively, the network system may be constructed as shown in FIG. 4. That is, the network system may be constructed in a structure in which a server apparatus 1 which stores data to be transmitted and PDAs 3a and 3b as receiver terminals are connected through a plurality of relay nodes 4a to 4i (hereinafter called simply "relay nodes 4" when they are dealt with as a whole) and the relay nodes 4b, 4c, 4e, and 4g are connected with format converters 5a, 5b, 5c, and 5d (hereinafter called simply "format converters 5" when they are dealt with as a whole).

This network system comprises a lot of format converters 5, unlike the example shown in FIG. 3. Therefore, conversion processing is divided between the plurality of format converters 5 by selecting a communication route. For example, route selection is carried out in case where the format converters 5a and 5b cannot increase processing loads due to format conversion processing for other receiver terminals when the PDA 3b receives moving picture data of MPEG4 format. The communication route becomes the shortest when data is transmitted to the PDA 3b through the relay nodes 4a, 4c, and 4f. If the format converter 5b cannot be used, the format converter 5c capable of performing format conversion processing is selected so that the transmitted data is transmitted to the PDA 3b with use of the communication route R3.

Figure 5:
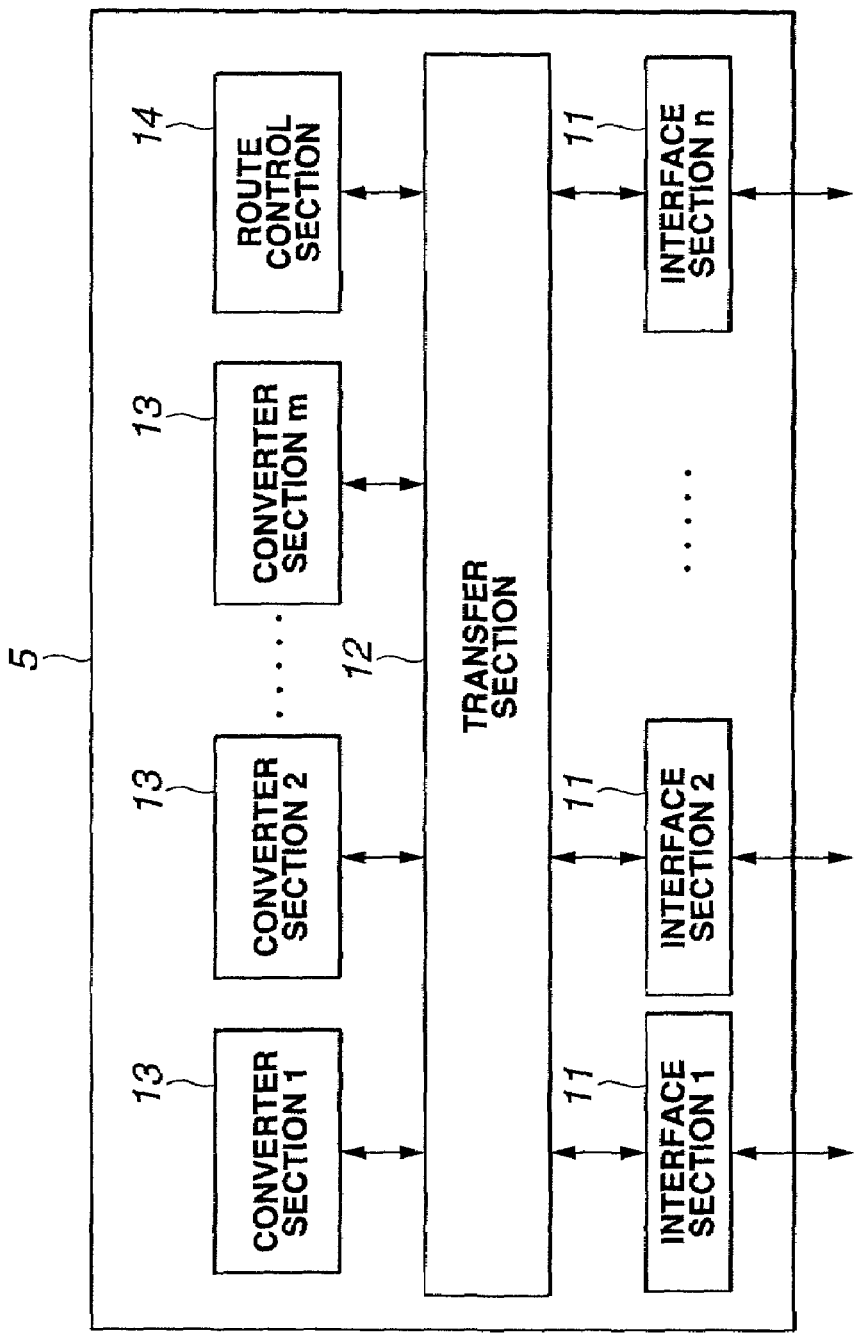
FIG. 5 is a block diagram showing a structure of a format converter.

Next explanation will be made of the structure of the format converters 5 with reference to FIG. 5.

The format converter 5 comprises n first to n-th interface sections 11 (hereinafter called simply "interface sections 11" when they are dealt with as a whole), a transfer section 12, m first to m-th converter sections 13 (hereinafter simply called "converter sections 13" when they are dealt with as a whole), and a route control section 14.

There are provided n interface sections 11 (n≧1) which are connected with the relay nodes 4 and peripheral devices through communication lines, to transmit/receive data to/from the relay nodes 4 and the peripheral devices. The interface sections 11 are classified into two types depending on their connection forms. The first form thereof is N-type (network-type) for connection with an external network and the second form is non-N-type other than the N-type.

An example of the N-type will be an interface connected with a communication line forming a network system or another network. The N-type interface section 11 receives data transmitted from another relay node 4 and controls supply of moving picture data to the converter section 13 through the transfer section 12. Further, the interface section 11 transmits moving picture data subjected to format conversion by the converter section 13, as transmitted data, to the relay nodes 4.

An example of the non-N-type will be a video S-terminal or a hard disc interface. The non-N-type interface section 11 has a function of converting data from peripheral devices.

The transfer section 12 performs processing for transferring data inputted from the interface sections 11 to any of the converter sections 13 and the route control section 14, and performs processing for transferring data processed by the converter section 13 and the route control section 14 to any of the interface sections 11.

There are provided m converter sections 13 (m≧0) which are inputted with moving picture data from the transfer section 12. The sections 13 then perform format conversion on the moving picture data and output the data to the transfer section 12. The converter sections 13 makes format conversion for converting moving picture data of e.g., the MPEG2 format into moving picture data of the MPEG4 format. The converter sections 13 are constructed to make respectively different kinds of conversion processing.

Conversion processing performed by the converter sections 13 includes rate conversion of moving picture data of MPEG2 format, resolution conversion, frame rate conversion, color and luminance signal conversion, and sampling rate conversion. Further, the conversion processing includes processing for converting a signal of NTSC (National Television System Committee) system into data of MPEG format. Also, the conversion processing includes data conversion between the N-type interface sections 11 and the non-N-type interface sections 11. Also, the conversion processing includes processing for transmitting data inputted through the non-N-type interface sections 11, such as format conversion from the disc interface to the network interface.

The route control section 14 is equipped with route communication protocol and exchanges route control protocol packets with other communication nodes forming part of a network system through the N-type interface sections 11. In this manner, the route control section 14 notifies information of the format converter 5 itself and information of the communication nodes connected through a communication line, to the outside. Also, the route control section 14 obtains information of other communication nodes from the outside, as communication network parameters, thereby to obtain format conversion parameters indicating the types of format conversions of the other communication nodes having converter sections 13.

The route control section 14 identifies communication nodes connected with N-type interface sections 11 by the route communication protocol. When the route control section 14 receives data transmitted from an interface section 11, the route control section 14 firstly refers to format information contained in the transmitted data and identifies the format of moving picture data contained in the transmitted data. The route control section 14 identifies a receiver terminal as a transmitting destination, referring to address information contained in the transmitted data, and recognizes which interface section 11 should make transmission. The section 14 then outputs the transmitted data to any of the interface sections 11. The route control section 14 refers to format conversion parameters as the types of the formats with which the receiver terminal is compatible, and controls which converter section 13 should be inputted with the moving picture data inputted to the interface sections 11. The format conversion is thus controlled.

When data which requires format conversion is inputted to the first interface sections 11, the route control section 14 of the format converter 5 thus constructed recognizes the transmission source from transmission source information contained in the transmitted data, the format of moving picture data from format information, and types of format conversion from address information. As indicated by the continuous line in FIG. 6, the route control section 14 controls inputting of data to the first converter sections 13 through the transfer section 12 from the first interface sections 11, based on the types of format conversion, and also controls outputting of data subjected to the format conversion by the first converter section 13, from the second interface section 11 through the transfer section 12, based on the address information.

Figure 6:
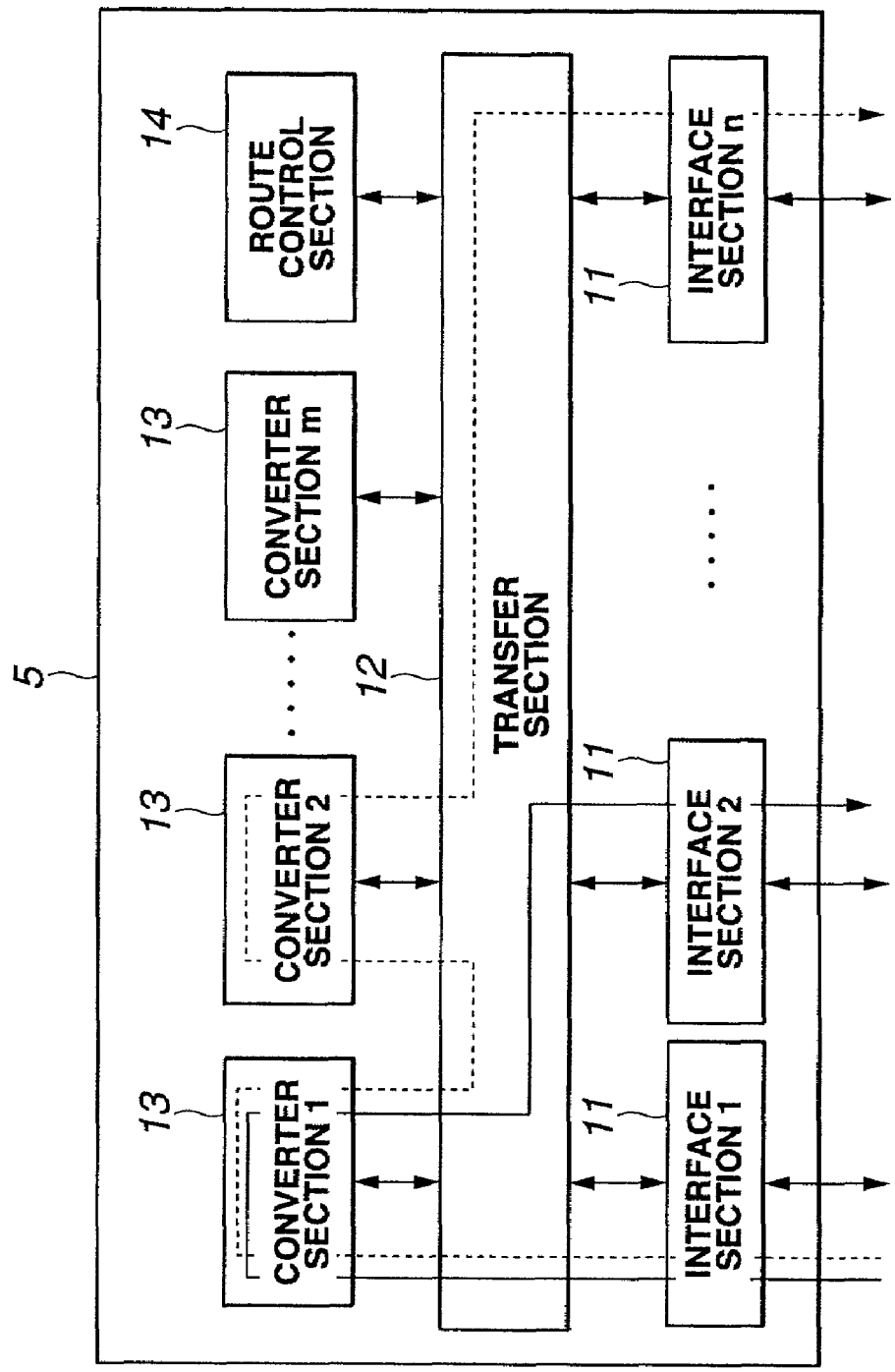
FIG. 6 is an explanatory block diagram for an operation of the format converter.

In addition, when data which requires two-time format conversions is inputted to the first interface section 11, as indicated by the broken line in FIG. 6, the route control section 14 of the format converter 5 makes control as follows. Firstly, moving picture data is inputted to the first converter section 13 through the transfer section 12 from the first interface section 11, to perform format conversion for the first time. Then, the moving picture data subjected to format conversion for the second time is inputted to the second converter section 13 from the first converter section 13 through the transfer section 12, to perform format conversion for the second time. Further, the data is outputted from the n-th interface section 11 through the transfer section 12 from the second converter section 13.

Figure 7:
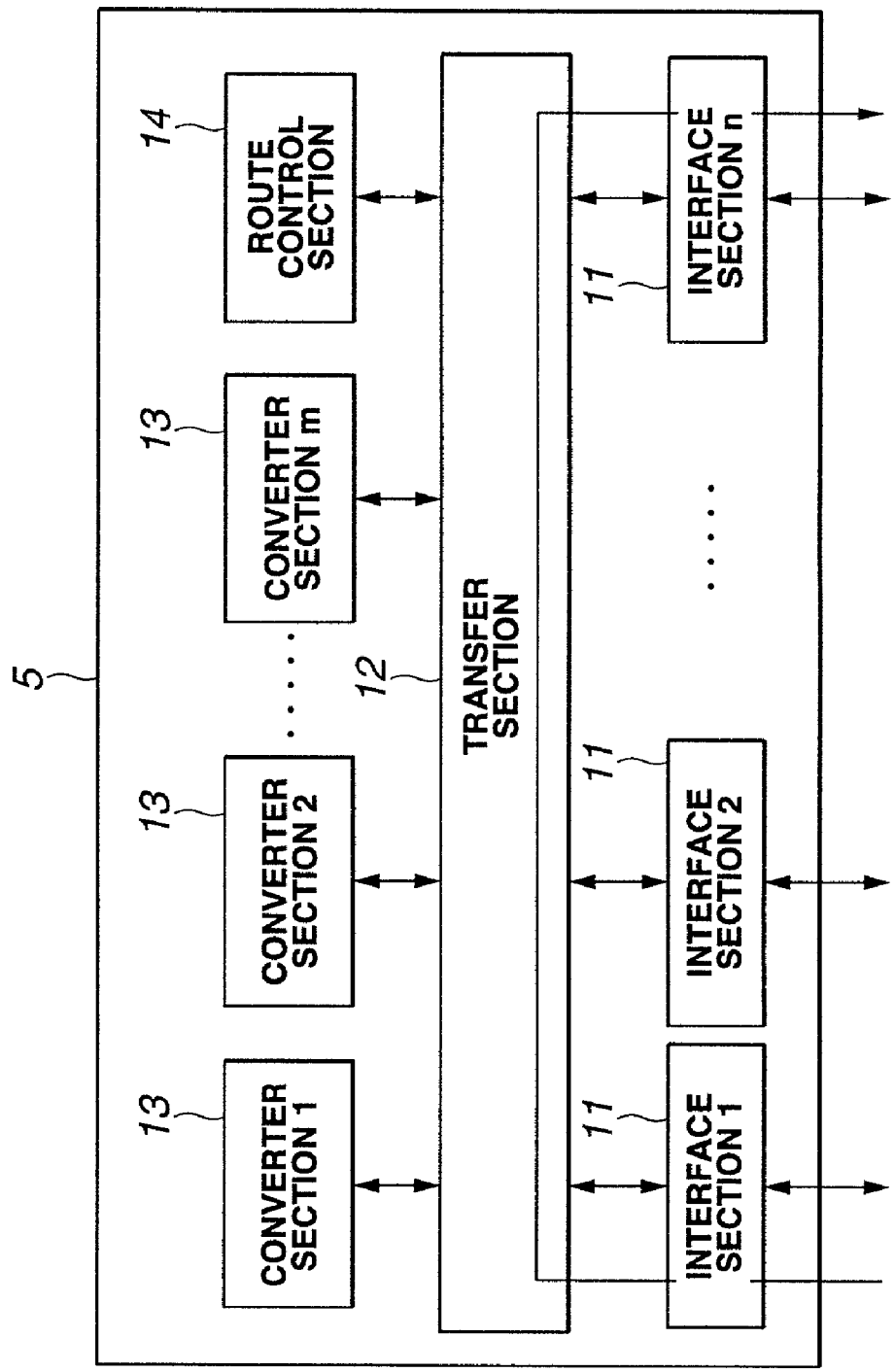
FIG. 7 is an explanatory block diagram for another operation of the format converter.

Further, when moving picture data which does not require format conversion is inputted from the first interface section 11, as shown in FIG. 7, the route control section 14 controls outputting of the data from the first interface section 11 through the transfer section 12 and then through the n-th interface section 11. This processing is the same processing as the packet transmission processing in an ordinary router.

Figure 8:
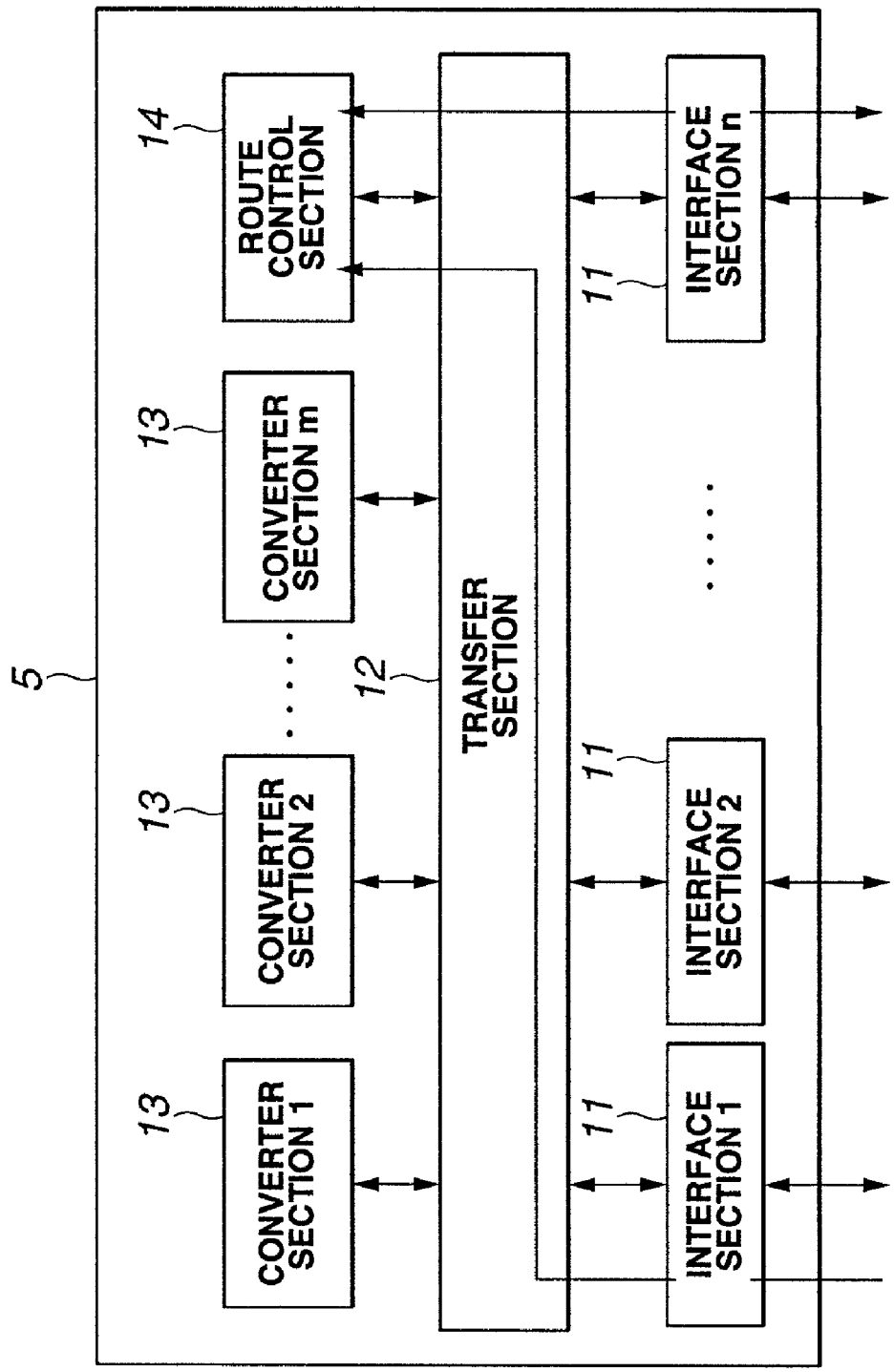
FIG. 8 is an explanatory block diagram for further another operation of the format converter.

Further, as shown in FIG. 8, when route control protocol is executed with respect to a communication node connected with an N-type interface section 11, the route control section 14 identifies the interface section 11 that should be used in accordance with the communication node which performs transmission/reception The route control protocol is transmitted/received only through N-type interface sections 11.

Figure 9:
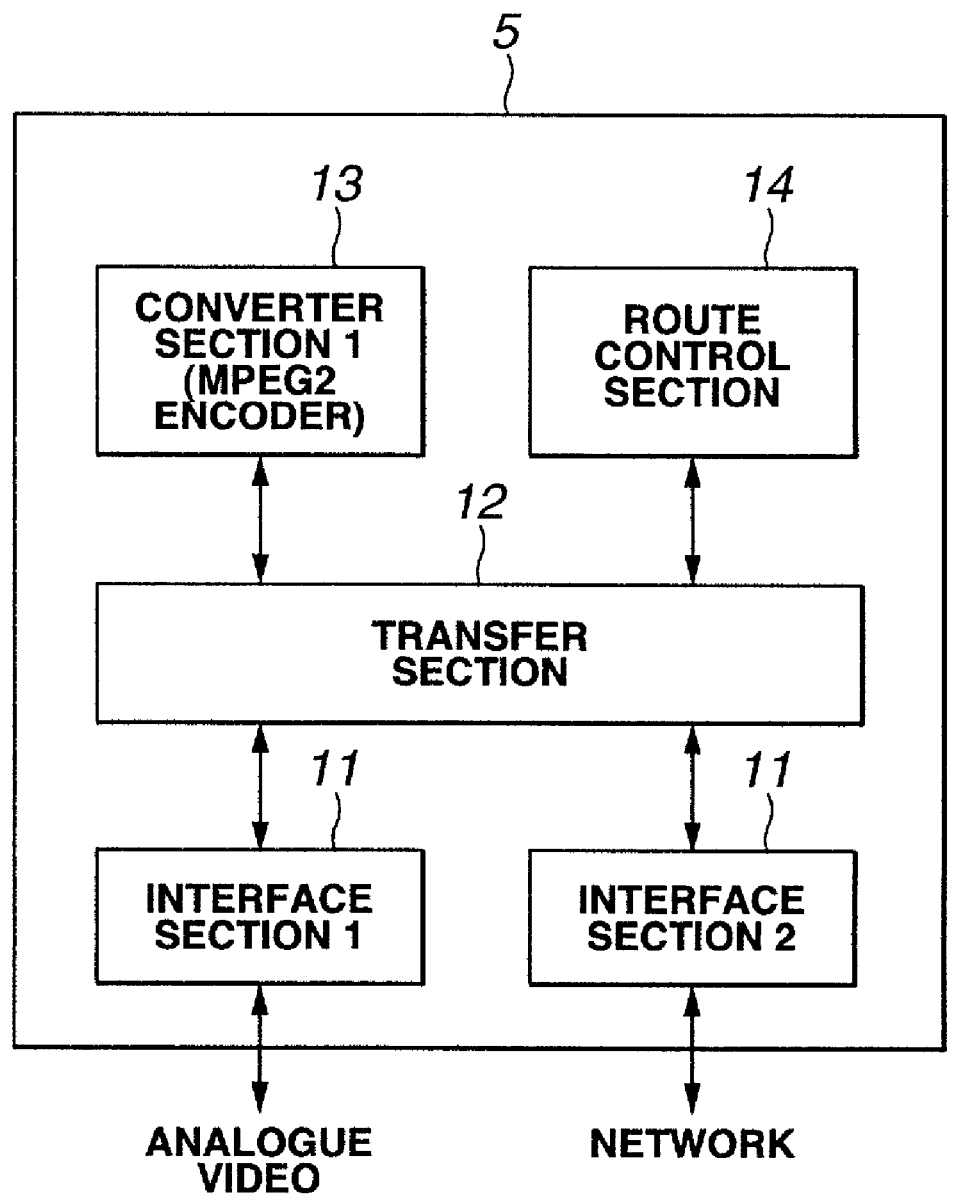
FIG. 9 is a block diagram showing another structure of the format converter.

Alternatively, this format converter 5 may be constructed as shown in FIG. 9. This format converter 5 is constructed by interface sections 11, a transfer section 12, a converter section 13, and a route control section 14, like the example shown in FIG. 5. The present example is connected with an analogue camera which generates an analogue video signal, and the analogue signal is format-converted into an MPEG2 signal and transmitted to a network.

In the format converter 5, the interface section (interface 1) 11 functions as an analogue video input terminal, and the converter section 13 functions as an MPEG encoder. The interface section (interface 2) 11 functions as a network interface. In this kind of format converter 5, for example, a video image picked up by an analogue camera apparatus can be inputted from the analogue video input terminal to the converter section 13 through the transfer section 12. The video image can be encoded into the MPEG2 format and transmitted from the network interface.

Further, a normal router can be considered as a format converter which does not have the converter section (m=0), viewed from the embodiment of the conversion processing as described above.

Next, explanation will be made of route control protocol installed on the route control section 14.

The route control section 14 transmits/receives information concerning respective format converters 5 and information concerning respective interface sections 11 to/from other format converters 5.

The route control section 14 transmits/receives format conversion parameters as information concerning respective converter sections 13, as information concerning the format converters 5. The format conversion parameters are information indicating input formats and output formats which can be converted, information indicating the amount of data (the number of total streams and total bands) which can be converted simultaneously, the amount of data which is being subjected to conversion processing, the delay time required for format conversion, and the like.

In the route control section 14, information concerning the respective interface sections 11 includes information indicating the types of the interface sections 11 (N-type and non-N-type) and communication network parameters as information concerning the network connected to the interface sections 11.

If an interface section 11 is of the N-type, information indicating the interface section is information indicating the types of interfaces compatible with Ethernet, ATM (Asynchronous Transfer Mode) and the like, information indicating a band which ca be processed (e.g., 10M bps or the like), and information indicating an address assigned to the interface section 11 (e.g., IP (Internet Protocol) address). If an interface section 11 is of the non-N-type, there is information indicating the type of the interface section 11 (audio, video, NTSC, or the like).

The communication network parameters as the information concerning a connected network are information related only with the interface sections 11. The information indicates the delay time between the communication nodes, loads for transmitted data (the band being used among all bands), or a measure of a transmission distance abstracted as metric.

The route control section 14 transmits/receives information concerning the format converters 5 and the interface sections 11 described above, to determine the communication route R of the transmitted data. For example, explanation will be made with reference to the network system constructed by six communication nodes, as shown in FIG. 10A. The network system shown in FIG. 10A is comprised of first to sixth communication nodes. The first node is a server apparatus 1 which transmits transmitting data containing moving picture data of format A. The second communication node is a format converter 5 which converts data of format B into format C. The third communication node is a format converter 5 which converts data of format A into format B. The fourth communication node is a format converter 5 having a function of converting data of format A into format B and a function of converting data of format B into format C. The fifth communication node is a normal router. The sixth node is a receiver terminal which receives data of format C.

Considering that the first and sixth communication nodes are format converters 5, the network system can be expressed as shown in FIG. 10B. That is, it is considered as format conversion if data of format X transmitted from the first communication node is read from a disc or encoded from an analogue signal. It is also considered as format conversion if data of format C received by the sixth communication node is converted into format Y. In the following, description of the format X and the format Y will be omitted to simplify the explanation.

Although methods of route control performed by the route control section 14 are classified into a distance vector type and a link state type, any type of methods can be taken. In the present embodiment, the methods are not limited to only one of these types but explanation will be made of an example in which route control of the link state type is performed.

That is, in accordance with the route control protocol, the route control section 14 of each communication node uses above-described format conversion parameters and communication network parameters which are exchanged with another communication node to construct a network topology as an image graph shown in FIG. 10A and to add dynamic and static information concerning the communication nodes and the network system as parameters of vertices and branches. Based on the image graph of the network system thus constructed, a route is determined by using predetermined algorithm. In the route control sections 14, determinations of routes at respective communication nodes are matched with each other and data is correctly sent from the transmitter side to the receiver side, as long as the image graphs constructed in all communication nodes are equal to each other and routes are determined by one same algorithm.

To find a communication route from a given communication node N to a given communication node M by an algorithm calculated in each communication node, it is necessary to select a communication route which satisfies a desired condition from a plurality of communication routes which connect these nodes to each other. The route control section 14 uses a format conversion parameter indicating format restriction and a communication network parameter indicating a measure for evaluating the route, as conditions for selecting the communication route.

The format conversion parameter described above indicates a condition that allows transmitted data to be subjected to format-conversion appropriately and transmitted from the communication node N to the communication node M, passing through an appropriate format converters 5.

The communication network parameter is a measure for evaluating a route or the like which causes the least delay or which applies the least load to the network system. This parameter is used as a measure for selecting an appropriate route referring to the static and dynamic states of the network system and the static and dynamic states of the format converters 5.

More specifically, in the route control section 14, an evaluation parameter of a communication route is given by an evaluation function f for calculating an evaluation value v, using the communication network parameter r indicating the delay or load of the communication route connecting the communication nodes, as an input. In this manner, in the route control section 14, a communication network parameter r is selected such that the evaluation value v becomes the best when $v=f(r)$ is calculated. The route control section 14 thus obtains a dynamic evaluation value v by using the communication parameter r which dynamically changes depending on the situation of the network system.

Figure 11:
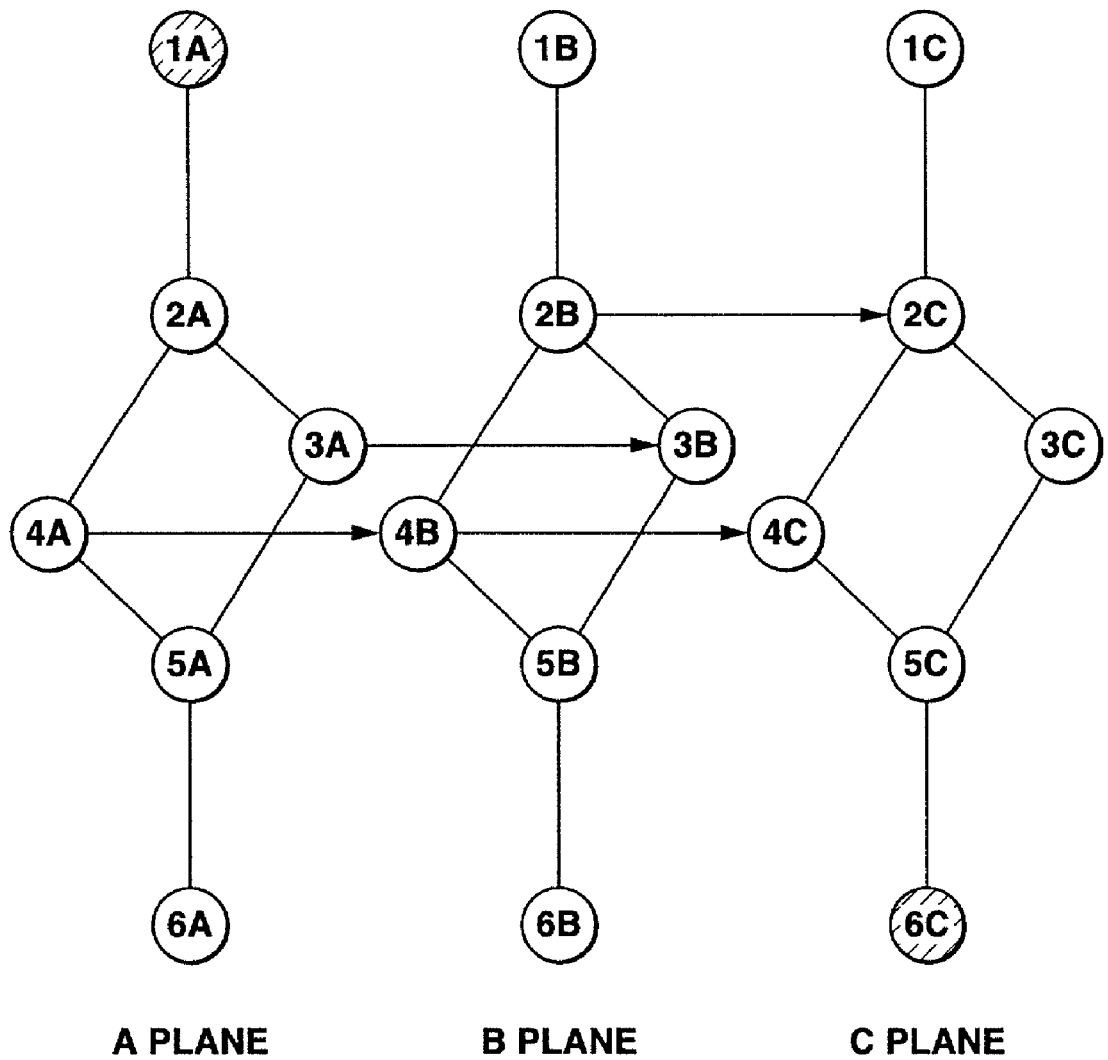
FIG. 11 is a diagram which explains conversion of image graphs.

In FIG. 10A, explanation will be made with use of an image graph converted as shown in FIG. 11, with respect to processing for obtaining an optimum communication route among a plurality of communication routes from the first communication node to the sixth communication node. The route control section 14 obtains information concerning the connection destination of each interface section 11 and also information from another communication node, to construct an image graph as shown in FIG. 11.

In this image graph, the communication node is indicated by the symbol ○, and formats are indicated at references A, B, and C. For example, the formats A, B, and C are MPEG2, MPEG4, and DV. Alternatively, the formats A, B, and C may be respectively set to 2, 4, and 8 Mbps of one same MPEG2 format. Alternatively, the formats may respectively be set depending on the resolution, frame rate, color and luminance, or audio sampling rate.

At first, the route control section 14 copies the image graph shown in FIG. 10 for the number of times corresponding to the number of target formats. That is, format conversion takes place twice, e.g., once from the format A into the format B and once from the format B into the format C. The route control circuit 14 thus copies the image graph twice, and sets three image graphs, which are obtained by copying the image graph twice, as A, B, and C planes, as shown in FIG. 11.

Next, the route control section 14 connects the planes to each other, based on the format conversion function of each communication node. For example, the second communication node has an ability to perform conversion from the format B into the format C, in FIG. 10. Therefore, a branch is prepared from the communication node 2B to the communication node 2C. Passing through this branch means format conversion from the format B into the format C.

The image graph thus converted cites candidates for a plurality of communication routes that satisfy the format restriction condition based on the format conversion parameters, in a first stage. In a second stage, an appropriate communication route is selected, based only on the communication network parameters of the communication routes.

Figure 12:
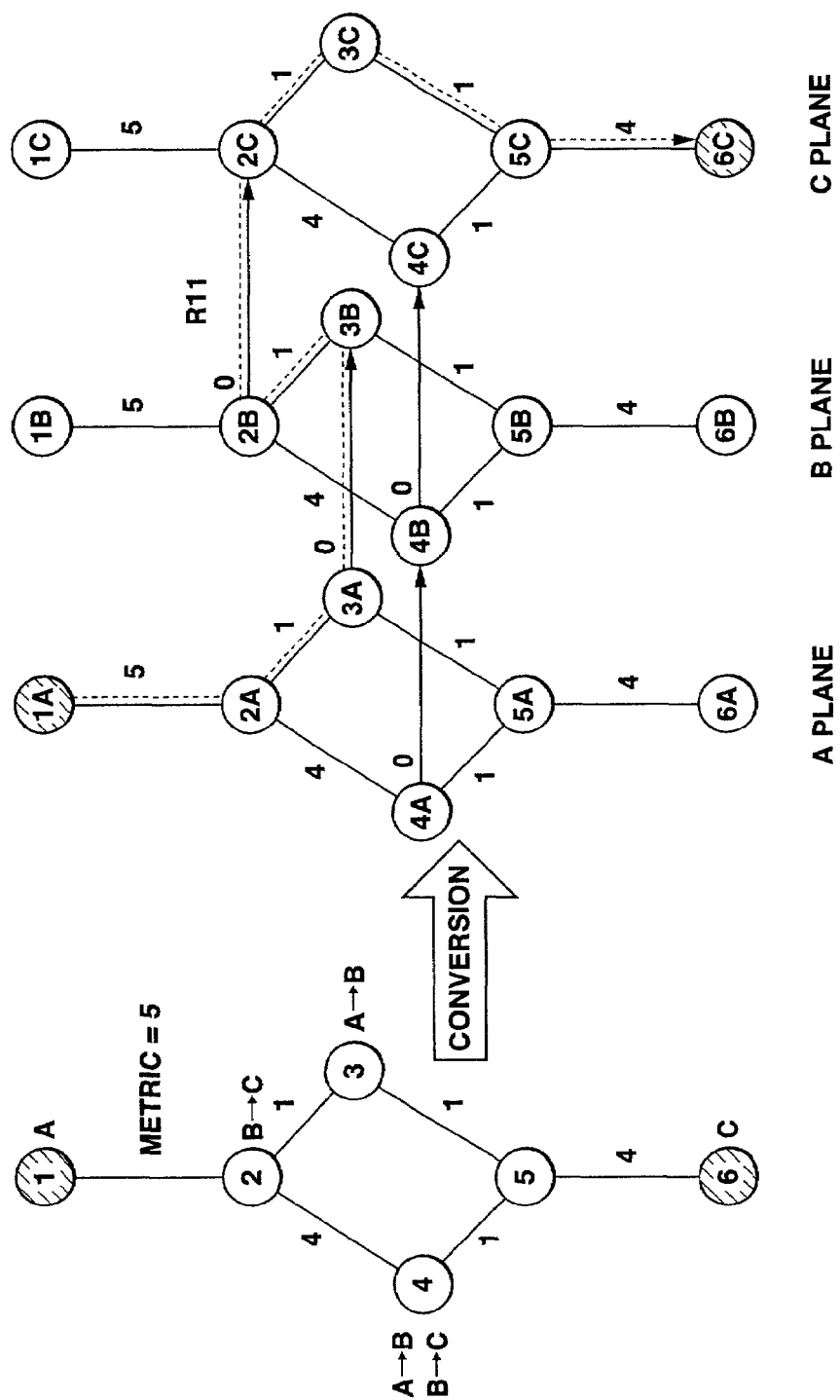
FIG. 12 is a diagram which explains route control in a network system to which the present invention is applied, with use of image graphs.

FIG. 12 shows an example of a network system having the same structure as that shown in FIG. 10. In this example, the information which the route control section 14 exchanges by the route control protocol are information concerning those formats that can be converted and information concerning metric of the network system. Delay and dynamic loads at the tines of conversion and data transmission are not considered. That is, the route control section 14 performs communication route control, referring only to the metric contained in the communication parameter and the type of format conversion contained in the format conversion parameter.

In the image graph after conversion, metric is defined to be equal to that of the image graph before conversion, and metric in each branch connecting planes is set to "0". From FIG. 12, the metric on the communication route from the first communication node to the sixth communication node is smallest in the case where data is transmitted in the order of the first communication node, the second communication node, and the third communication node and is subjected to conversion into the format B, as shown at the plane A. Next, the transmitted data is transmitted from the third communication node to the second communication node, as shown at the plane B, and the data is converted from the format B into the format C, at the second communication node. Next, the transmitted data including moving picture data of the format C is transmitted to the sixth communication node, as shown in the plane C. In case of this communication route R11, the shortest communication route is to retrace the route between the second and third communication nodes, through which the data has once passed, and it is possible to obtain such an advantage that cannot be realized by a normal route control method.

According to the network system comprising this route control section 14, the communication route R11 can be selected in correspondence with the metric and the format, so that network resources can be used efficiently.

Also, according to this network system, format conversion processing can be distributed to a plurality of format converters 5. It is therefore possible to realize distribution of loads, including route control.

Further, according to this network system, a large number of format converters are provided for format conversion which takes place at a high frequency, and less format converters 5 are provided for format conversion which takes place at a low frequency. In this manner, the efficiency of using the format converters 5 can be maximized.

Figure 13:
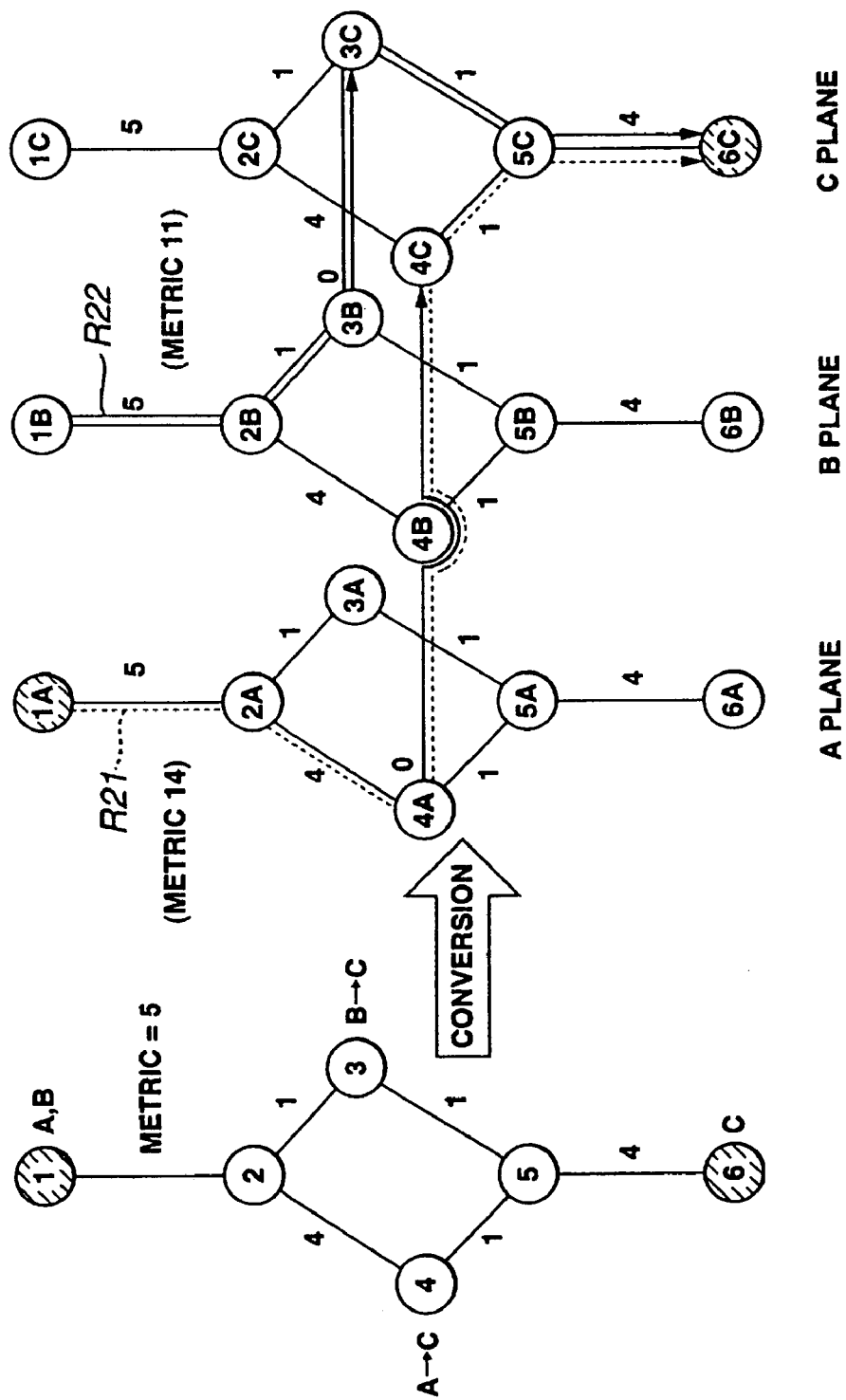
FIG. 13 is a diagram which explains other route control in the network system to which the present invention is applied, with use of image graphs.

FIG. 13 shows an image graph in case where a communication node corresponding to a data transmission apparatus or a receiver terminal can select a transmittable or receivable format among a plurality of formats. That is, it is supposed that the first communication node transmits data containing moving picture data of either format A or B in FIG. 13.

In the case shown in FIG. 13, the route control section 14 obtains a communication route R21 from the first communication node (1A) to the sixth communication node (6C), on which the metric is smallest with A as a starting format, and a communication route R22 from the first communication node (1B) to the sixth communication node (6C), on which the metric is the smallest with B as a starting format, in the image graph after conversion. The route control section 14 further selects a communication route which has the smaller metric among the two communication routes.

Each of the communication routes in FIG. 13 is the communication route R2 which passes through the first, second, fourth, and fifth communication nodes, when moving picture data is transmitted in the format A. When moving picture data is transmitted in the format B, it is the communication route R22 which passes through the first, second, third, and fifth communication nodes. The latter communication route attains a smaller metric and is therefore an optimal communication route.

Likewise, if there are a plurality of formats which can be received in the receiver side, communication routes are calculated respectively for the formats, and the optimal one is selected from the communication routes.

According to this network system, the data format transmitted from the receiver side or the transmitter side can be selected so that network resources can be used efficiently.

Figure 14:
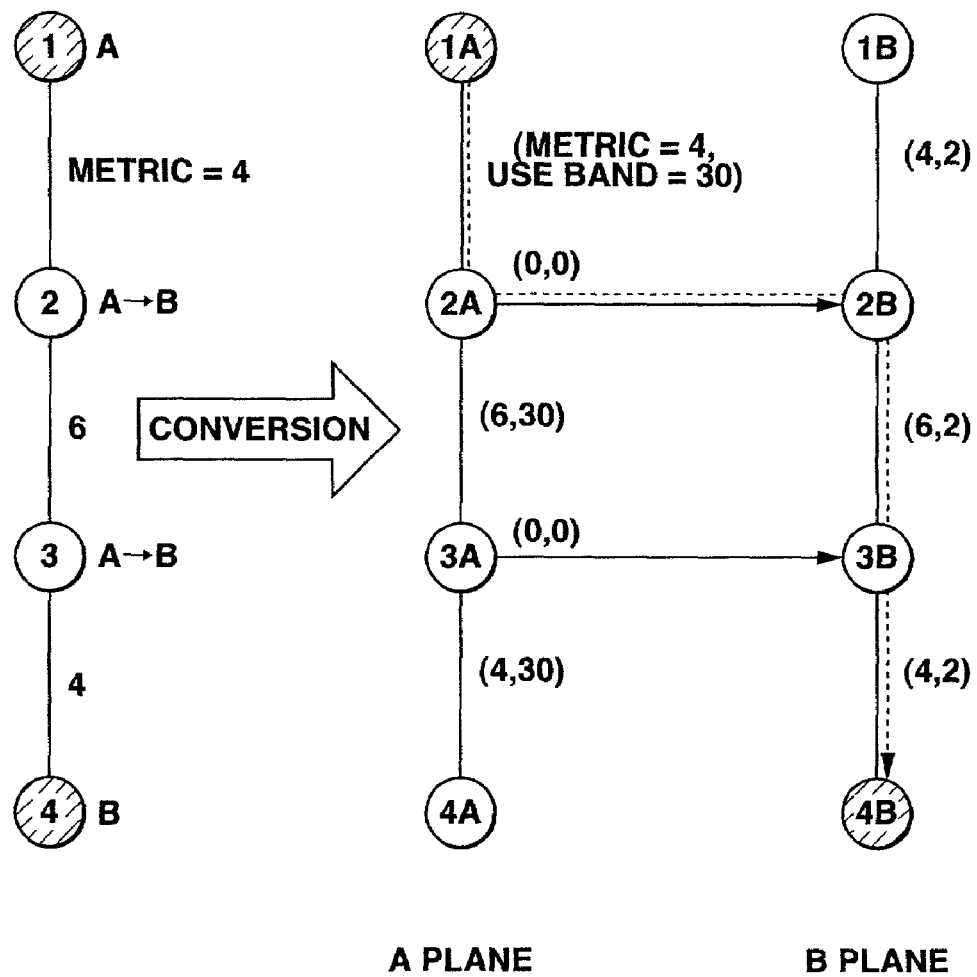
FIG. 14 is a diagram which explains further other route control in the network system to which the present invention is applied, with use of image graphs.

FIG. 14 shows an image graph when a communication route is selected on the basis of a plurality of evaluation parameters for a communication route. In FIG. 14, there are two candidates for a communication route to transmit data from the first communication node to the fourth communication node. One is a communication route which transmits data through the first communication node, second communication node (at which data is converted from the format A into the format B), the third communication node, and the fourth communication node, and the other is a communication route which sends transmitting data through the first communication node, the second communication node, the third communication node (at which data is converted from the format A into the format B), and the fourth communication node.

In this case, if a route selection is made where the type of the format which can be converted at each communication node, and the metric of the network system are used as parameters, as described above, both of the above two communication routes have an equal metric. Then, the route control section 14 selects a communication route, for example, referring further to information concerning the use band of the network system. That is, if the use band required for transmitting moving picture data of the format A (e.g., data of a DV system) is larger than the use band required for transmitting moving picture data of the format B (e.g., data of MPEG4), it is determined that the use band of the entire network system becomes smaller when format conversion which can be regarded as a load to the network system is carried out at the second communication node. Specifically, the route control section 14 determines that consumption of the use band between the second and third communication nodes is reduced.

At this time, i.e., when selecting the communication route, the route control section 14 refers to two evaluation measures, i.e., the use band of data in addition to the metric, and adds them as branches of the image graph. The route control section 14 thus sets the evaluation measures of the communication route, based on the metric and use band. Specifically, the route control section 14 supposes that the use band was 30 Mbps when moving picture data of the format A was transmitted and that the use band was 2 Mbps when the moving picture data of the format B was transmitted. Further, 30 is added as a parameter to a branch of the plane A, as well as 2 to a branch of the plane B. At this time, the route control section 14 determines an evaluation value such that the communication route which has a small total of use bands of branches is selected as a communication route which has a low load to the network, if the two communication routes have an equal metric. Further, the route control section 14 calculates an evaluation function to give that the use band of the communication route R1 is "30+2+2=34" and the use band of the communication route R2 is "30+30+2=62". In this manner, the route control section 14 selects the communication route 1.

In the example shown in FIG. 14, the route control section 14 selects a communication route on the basis of the use band, if evaluation values obtained using metrics as evaluation parameters are equal to each other so that a communication route cannot be selected on the basis of the metrics. However, the evaluation values of the communication routes can be compared with each other by weighting the evaluation values, even if the evaluation values of the communication routes based on two evaluation parameters are different from each other.

Also, the route control section 14 may make a selection from the communication routes R1 and R2 by using loads to the format converters 5 as evaluation parameters, except for use bands of data based on formats.

Figure 15:
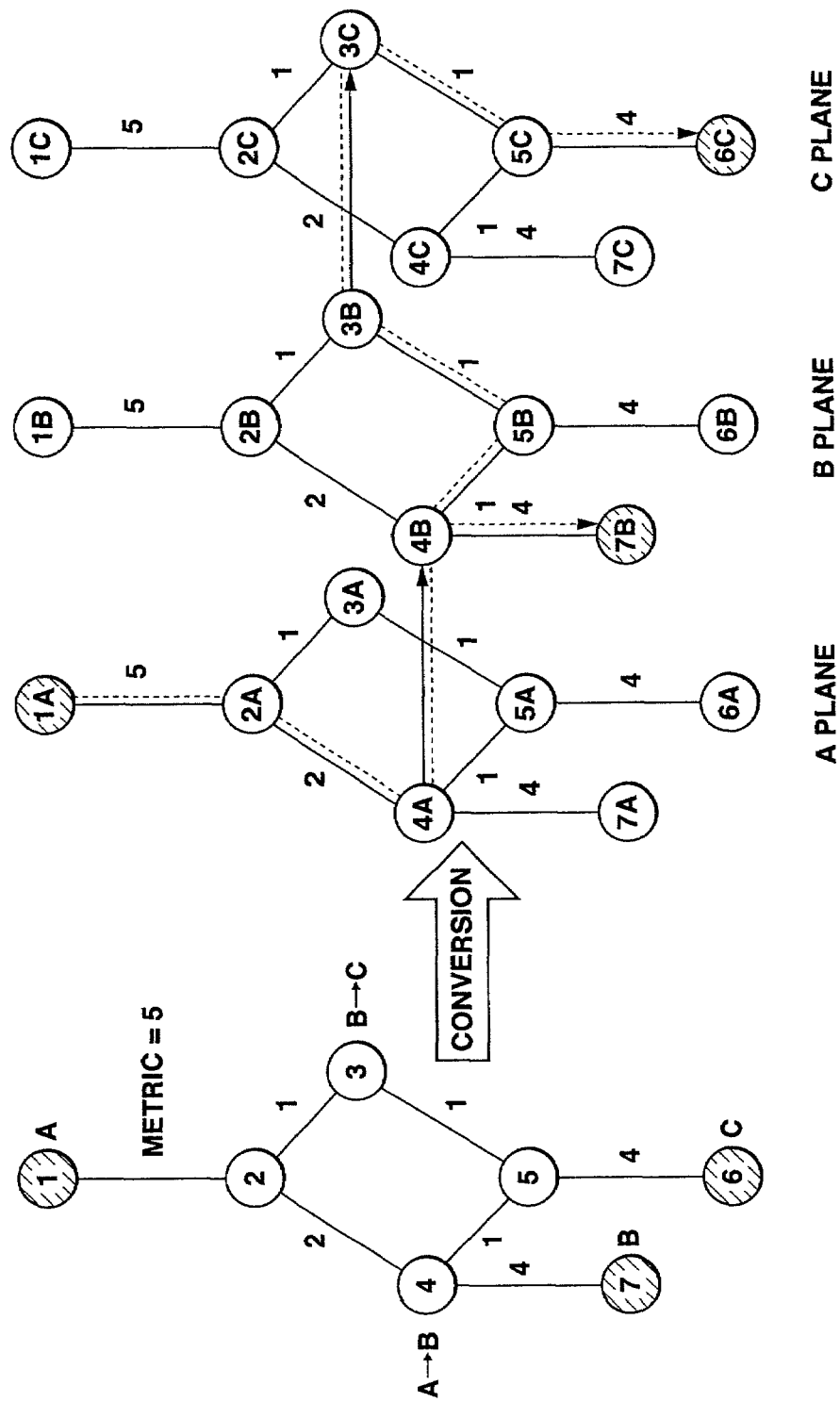
FIG. 15 is a diagram which explains further other route control in the network system to which the present invention is applied, with use of image graphs.

FIG. 15 shows an image graph when moving picture data is multi-cast to the sixth and seventh communication nodes from the first communication node. In this case, the first communication node corresponds only to the format A, the sixth communication node only to the format C, as well as the seventh communication node only to the format B.

When only those metrics that are added to branches in FIG. 15 are used as evaluation parameters, the route control section 14 selects, as communication routes having the smallest metric, a communication route which transmits transmitting data through the first communication node, the second communication node, and the fourth communication node (at which the data is converted from the format A into the format B) to the seventh communication node, and a communication route which transmits transmitting data from the fourth communication node through the fifth communication node, the third communication node (at which the data is converted from the format B into the format C), and the fifth communication node to the sixth communication node.

According to the network system comprising the route control section 14 which makes processing as described above, transmitting data can be transmitted, kept in the same format as that of the communication node in the transmitter side, up to the branch node at which the transmitting data is distributed to a branch, even when multi-cast communication is carried out. Therefore, moving picture data of a different format need not be generated before the branch node by the communication node in the transmitter side. Network resources can thus be efficiently used.

Figure 16:
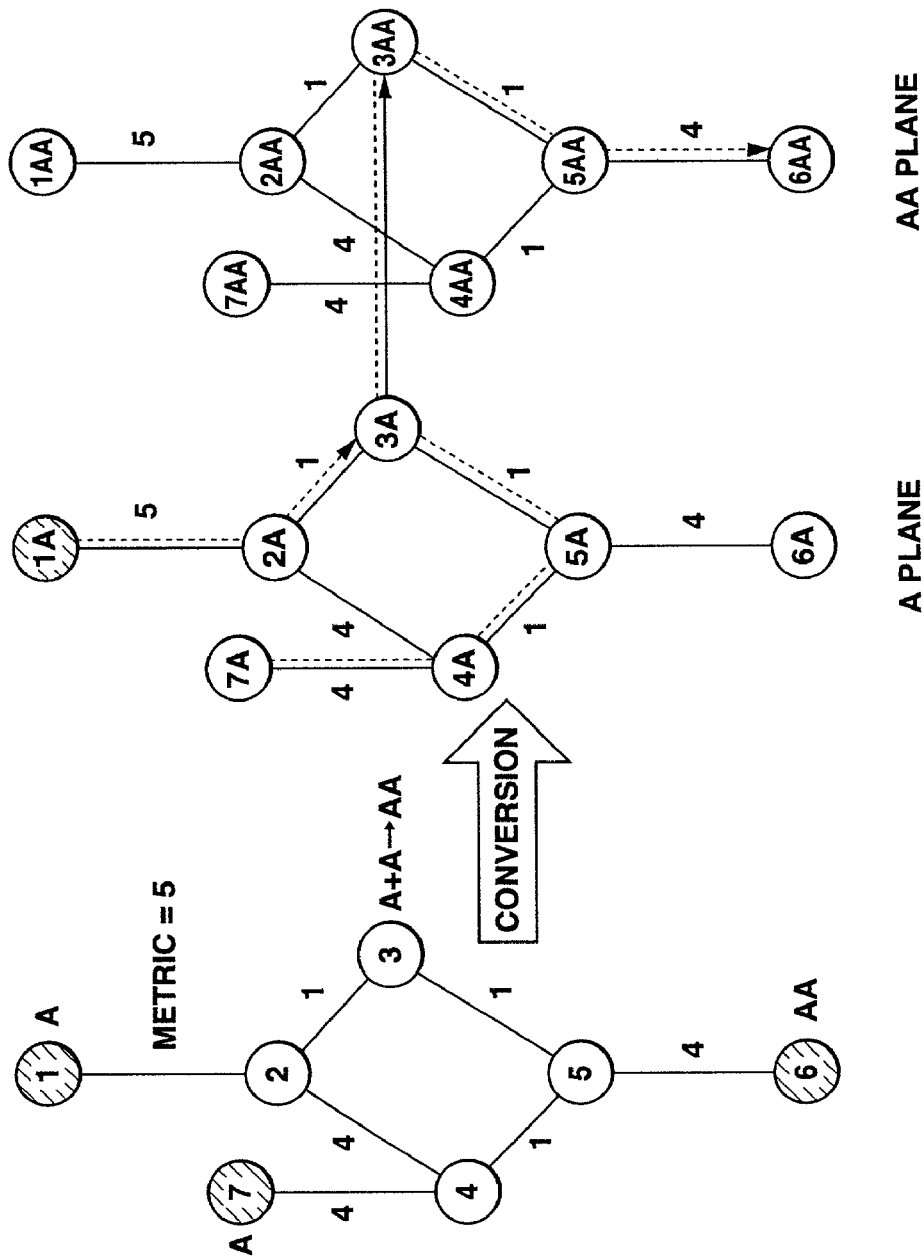
FIG. 16 is a diagram which explains further other route control in the network system to which the present invention is applied, with use of image graphs.

FIG. 16 shows an image graph when moving picture data pieces individually separated from the first and seventh communication nodes are transmitted to the sixth communication node. In this example, moving picture data transmitted in MPEG2 format from the first communication node is merged by an effect such as screen division or the like and is received as one video by the sixth communication node. This example shows a case where the first and seventh communication nodes correspond only to the format A and the sixth communication node corresponds to the format AA. Also, in this example, the formats before and after the merging are respectively formats A and AA although the formats before and after the merging may be equal to each other.

When those metrics that are respectively added to braches in FIG. 16 are used as evaluation parameters, the route control section 14 transfers data transmitted from the first communication node to the second and third communication nodes, and also transmits data transmitted from the seventh communication node to the fourth, fifth, and third communication nodes. At the third communication node, the data from the first communication node and the data from the seventh communication node are merged into the format AA and then transmitted to the sixth communication node through the fifth communication node.

According to the network system comprising the route control section 14 which performs the processing as described above, a different communication node in the transmitter side can be used by merging data at the third communication node, even if a communication node in the receiver side does not have a function of merging the data. Data can be dispersedly stored in the communication node in the transmitter side.

The route control section 14 can also determine a route while reserving network resources, for example, by a combination with resource reservation protocol, even in case of performing route control under condition that a communication node possesses only partial information or incorrect information.

What is claimed is:

1. A data converter for use in a network system comprised of a plurality of communication nodes in which data transmitted from a transmitter communication node are adapted to be received by a set of receiver communication nodes, the data converter comprising:

data reception means for receiving data transmitted from the transmitter communication node to a first receiver communication node, with the transmitted data being formatted in a first format;

information reception means for receiving a communication network parameter associated with the plurality of communication nodes of the network system;

format conversion means comprising at least one format converter each used for converting said first format of the transmitted data received by the reception means at least in part to a second format;

route control means for determining a communication route using a network topolgly provided by connecting the communication nodes based on selection from a plurality of network plans using the format conversion parameter, each network plan being provided based on a format, a format conversion parameter relating to the first format of the transmitted data received by the reception means, format conversion performed by the format conversion means, format conversion performed by another communication node, and/or the communication network parameter received by the information reception means; and transmission means for transmitting the transmitted data converted by the format conversion means to a second receiver communication node, in accordance with the communication route determined by the route control means.

2. The data converter according to claim 1, wherein the route control means determines the communication route, based on information associated with a communication distance between the communication nodes, as the communication network parameter.

3. The data converter according to claim 1, wherein the route control means determines the communication route, based on information associated with a transmission delay between the communication nodes, as the communication network parameter.

4. The data converter according to claim 1, wherein the route control means determines the communication route, based on information associated with a band used between the communication nodes, as the communication network parameter.

5. The data converter according to claim 1, wherein the route control means determines the communication route, based on information associated with a processing delay required for conversion processing at the communication node having the format conversion function, as the format conversion parameter.

6. The data converter according to claim 1, wherein the route control means determines the communication route, based on information associated with an amount of the transmitted data, as the format conversion parameter.

7. The data converter according to claim 1, wherein the route control means determines the communication route, based on information associated with a format of transmitted data which can be transmitted from the transmitter communication node, as the format conversion parameter.

8. The data converter according to claim 1, wherein the route control means determines the communication route, based on information associated with a format of transmitted data which can be received by the receiver communication node, as the format conversion parameter.

9. A data conversion method for use in a network system having a plurality of communication nodes, in which data transmitted from a transmitter communication node are adapted to be received by a set of receiver communication nodes, the method comprising steps of:

receiving initially a communication network parameter associated with the network system connecting the communication nodes;

converting a first format of the transmitted data received from the transmitter communication node at least in part to a second format;

determining a communication route, using a network topology provided by connecting the communication nodes based on selection from a plurality of network plans using the format conversion parameter, each network plan being provided based on a format, a format conversion parameter associated with the first format of the transmitted data, format conversion type, the format conversion performed by another communication node, and/or the communication network parameter, when converting the format of the transmitted data; and transmitting the converted transmitted data to a second communication node, in accordance with the communication route.

10. The data conversion method according to claim 9, wherein the communication route is determined, based on information associated with a communication distance between the communication nodes, as the communication network parameter.

11. The data conversion method according to claim 9, wherein the communication route is determined, based on information associated with a transmission delay between the communication nodes, as the communication network parameter.

12. The data conversion method according to claim 9, wherein the communication route is determined, based on information associated with a band used between the communication nodes, as the communication network parameter.

13. The data conversion method according to claim 9, wherein the communication route is determined, based on information associated with a processing delay required for conversion processing at the communication node having the format conversion function, as the format conversion parameter.

14. The data conversion method according to claim 9, wherein the communication route is determined, based on information associated with a data amount of the transmitted data, as the format conversion parameter.

15. The data conversion method according to claim 9, wherein the communication route is determined, based on information associated with a format of transmitted data which can be transmitted from the transmitter communication node, as the format conversion parameter.

16. The data conversion method according to claim 9, wherein the communication route is determined, based on information associated with a format of transmitted data which can be received by the receiver communication node, as the format conversion parameter.

17. A data transmission/reception apparatus, for use in a network system comprising a plurality of communication nodes, for relaying data transmitted from a first communication node and transmitting relayed data to a second communication node, the data transmission/reception apparatus comprising:

data reception means for receiving data transmitted from the first communication node;

route control means for determining a communication route using a network topology provided by connecting the communication nodes based on selection from a plurality of network plans using the format conversion parameter, each network plan being provided based on a format, a format of the data received by the reception means, and/or a format conversion parameter associated with a type of format conversion of another communication node; and transmission means for transmitting the data received by the reception means to a third communication node based upon the format of the received data, and in accordance with the communication route determined by the route control means.

18. The data transmission/reception apparatus according to claim 17, wherein
the route control means determines the communication route, based on information associated with a communication distance, as a communication network parameter.

19. The data transmission/reception apparatus according to claim 17, wherein
the route control means determines the communication route, based on information associated with a transmission delay between the communication nodes, as a communication network parameter.

20. The data transmission/reception apparatus according to claim 17, wherein
the route control means determines the communication route, based on information associated with a band used between the communication nodes, as a communication network parameter.

21. The data transmission/reception apparatus according to claim 17, wherein
the route control means determines the communication route, based on information associated with a processing delay required for conversion processing at the communication node having the format conversion function, as a format conversion parameter.

22. The data transmission/reception apparatus according to claim 17, wherein
the route control means determines the communication route, based on information associated with a data amount of the transmitted data, as the format conversion parameter.

23. A data transmission/reception method in a network system comprised of a plurality of communication nodes for relaying data from a first communication node and transmitting data to a second communication node, the method comprising the steps of:
receiving transmitted data from the first communication node;
determining a communication route using a network topology provided by connecting the communication nodes based on
selection from a plurality of network plans using the format conversion parameter, each network plan being provided based on a format,
a format of the data received from the first communication node, and/or
a format conversion parameter associated with a format conversion performed by another communication node; and
transmitting the received data to a third communication node based upon the format of the received data, and in accordance with the determined communication route.

24. The data transmission/reception method according to claim 23, wherein
the communication route is determined, based on information associated with a communication distance, as a communication network parameter.

25. The data transmission/reception method according to claim 23, wherein
the communication route is determined, based on information associated with a transmission delay between the communication nodes, as a communication network parameter.

26. The data transmission/reception method according to claim 23, wherein
the communication route is determined, based on information associated with a band used between the communication nodes, as a communication network parameter.

27. The data transmission/reception method according to claim 23, wherein
the communication route is determined, based on information associated with a processing delay required for conversion processing at the communication node having the format conversion function, as the format conversion parameter.

28. The data transmission/reception method according to claim 23, wherein
the communication route is determined, based on information associated with a data amount of the transmitted data, as the format conversion parameter.

29. A network system including a plurality of communication nodes, wherein data transmitted from a transmitter communication node are adapted to be received by a set of receiver communication nodes, comprising:
information obtaining means for obtaining a communication network parameter associated with a communication network connecting the communication nodes;
format conversion means comprising at least one format converter for converting a first format of the transmitted data from the transmitter communication node at least in part to a second format; and
route control means for determining a communication route using a network topology provided by connecting the communication nodes based on
selection from a plurality of network plans using the format conversion parameter, each network plan being provided based on a format,
a format conversion parameter relating to the first format of the transmitted data transmitted from the transmitter communication node and
format conversion performed by the format conversion means, and/or
the communication network parameter obtained by the information obtaining means.

30. The network system according to claim 29, wherein the route control means determines the communication route, based on information associated with a communication distance between the communication nodes, as the communication network parameter.

31. The network system according to claim 29, wherein the route control means determines the communication route, based on information associated with a transmission delay between the communication nodes, as the communication network parameter.

32. The network system according to claim 29, wherein the route control means determines the communication route, based on information associated with a band used between the communication nodes, as the communication network parameter.

33. The network system according to claim 29, wherein the route control means determines the communication route, based on information associated with a processing delay required for conversion processing at the communication node having the format conversion function, as the format conversion parameter.

34. The network system according to claim 29, wherein the route control means determines the communication route, based on information associated with a data amount of the transmitted data, as the format conversion parameter.

35. The network system according to claim 29, wherein the route control means determines the communication route, based on information associated with a format of transmitted data which can be transmitted from the transmitter communication node, as the format conversion parameter.

36. The network system according to claim 29, wherein the route control means determines the communication route, based on information associated with a format of transmitted data which can be received by the receiver communication node, as the format conversion parameter.

37. The network system according to claim 29, comprising the plurality of communication nodes having the format conversion means, wherein
different types of format conversion processing are carried out by each of the format conversion means.

38. The network system according to claim 29, comprising the plurality of communication nodes having the format conversion means, wherein
a first number of format conversion means are provided for format conversion with a high frequency while a second number of format conversion means are provided for format conversion with a low frequency, wherein the second number is smaller than the first number.

39. The network system according to claim 29, wherein
if the transmitter communication node or the receiver communication node can transmit/receive transmitting/transmitted data in a plurality of formats, the route control means obtains a communication route for every type of format, and controls the transmitter communication node or the receiver communication node so as to transmit/receive the transmitting/transmitted data in any of the plurality of formats.

* * * * *